(12) United States Patent
Goker

(10) Patent No.: US 6,359,748 B1
(45) Date of Patent: Mar. 19, 2002

(54) ELECTRONICALLY DAMPED FLEXURE BASED ACTUATOR SYSTEM

(75) Inventor: Turguy Goker, Solana Beach, CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/208,077

(22) Filed: Dec. 9, 1998

(51) Int. Cl.[7] .................................................. G11B 5/55
(52) U.S. Cl. .................................................. 360/78.02
(58) Field of Search ........................ 360/78.02, 75, 360/77.12; 318/562, 564, 568.17, 568.18, 611, 616

(56) References Cited

U.S. PATENT DOCUMENTS

| | | | | |
|---|---|---|---|---|
| 3,686,568 A | * | 8/1972 | MacMullan et al. ...... | 324/99 R |
| 4,353,020 A | * | 10/1982 | Veale ......................... | 318/601 |
| 5,227,709 A | * | 7/1993 | Gauthier et al. ............ | 318/685 |
| 5,589,749 A | * | 12/1996 | Davidson et al. ........... | 318/564 |

* cited by examiner

Primary Examiner—David Hudspeth
Assistant Examiner—James L Habermehl
(74) Attorney, Agent, or Firm—Fliesler, Dubb, Meyer & Lovejoy LLP

(57) ABSTRACT

An electronically damped actuator control system that determines an amount of damping to be applied to an actuator or other moving part. The amount of damping applied is proportional to a measured velocity of the actuator. The velocity is measured by at least one of (1) determining an amount of back-EMF generated according to the motion of the actuator, or, (2) based on a servo track or other positioning mechanism that identifies a position of the actuator or moving part. The amount of damping determined is fed back and summed into a force demand that is applied to a motor or other device utilized to apply force on the actuator or other moving part.

28 Claims, 10 Drawing Sheets

ELECTRONICALLY DAMPED FLEXURE BASED ACTUATOR SYSTEM

BACKGROUND OF THE INVENTION

1. Field of Invention

This invention relates to damping systems. The invention also relates to damping systems that measure the velocity of a moving part and determine an amount of damping to be applied to the moving part based on the velocity measured. The invention is more particularly related to a damping system that measures the velocity of a moving part, determines a damping factor based on the velocity, and electronically applies the damping factor to the moving part. The invention is still further related to a damping system for an actuator in a tape drive system that electronically measures actuator velocity, determines an amount of damping based on the velocity measured, and applies the damping electronically to the actuator.

2. Description of Related Art

One of the increasing demands placed on the design and manufacture of media storage devices is the ability to increase data density and thereby increase an amount of data that can be stored on the device. One method to increase data density on a tape is to increase the number of data tracks on the tape. However, increasing the number of tracks on a tape requires an increased tracking bandwidth in order to accurately place and maintain a read/write head at a selected track on the tape.

Conventional disk and tape drive systems utilize moving head systems that place the read/write head at selected tracks for reading and/or recording on a media. One type of moving head system commonly utilized in disk drive systems is a linear bearing system. FIG. 1 illustrates a conventional linear bearing system that comprises a head 10 and carriage 14 that slides along a linear bearing and rail system 12 in order to position the head 10 over an appropriate portion of a media 18 (tape) for reading and recording of data. An actuator 16 is electronically activated to apply motion required for positioning of the head 10.

The linear bearing system is an advantageous configuration because the sliding mechanism (linear bearing and rail combination), as a free-floating system, utilizes very little energy for movement and is not particularly susceptible to mechanical resonances. However, linear bearing systems will have difficulties or inaccuracies in tracking if dirt or dust particles become deposited on the rail, and therefore operate best in clean or sealed environments. Therefore, linear bearing systems are not well suited for use in tape drives because the bearing and rails are subject to dirt particle depositions from a number of sources, including particles from various tape cartridges placed in the tape drive, and particles in the air of the environment in which the tape drive is placed because the head and drive mechanisms are in an open system (i.e., not operating in a clean room or sealed in a clean environment).

FIG. 2 illustrates a conventional moving head system (spring mass system) 20 utilized in a tape drive. The moving head 10 is attached to a spring 22, and an actuator 24. The actuator 24 is electronically positioned by a voice coil 26. Thus, the voice coil 26 moves the actuator 24 to position the moving head 10 to a specific track on a tape (media 18).

The conventional tape drive moving head system is advantageous over linear bearing systems because it is less susceptible to tracking inaccuracies caused by dust particles or other dirt that may interfere with moving parts. However, because the moving head system 20 is not a free-floating system (i.e., a spring is attached to the moving head), the actuator 24 requires power to work against the spring 22 at all times. The spring also causes additional problems by increasing susceptibility of the system to mechanical resonances (the spring will resonate similar to a string of a guitar or tuning fork).

The frequency of mechanical resonances experienced in conventional tape drive moving head systems can be calculated from a number of factors, including mass of moving parts (head 10, spring 22, and actuator 24, for example) and a spring constant ($K_s$) of the spring 22. Generally speaking, conventional tape drive moving head systems are designed to place the mechanical resonance at either (1) a low frequency to keep the resonance in band and then provide other mechanisms to either eliminate or reduce effects of the resonance, or, (2) at a high frequency to push the resonance out of band, in which case no other mechanisms are required.

A method of providing a low resonance system is to utilize a high mass moving head. However, a high mass moving head causes control problems because movement of a high mass moving head is more difficult to control.

A method of providing a high resonance system is to utilize a high spring constant (Ks) for the spring 20, which increases the resonance frequency. However, a high spring constant is disadvantageous because a stiffer spring requires greater power expenditure in order to place and maintain head position (i.e., placement of the head requires continuous work against the spring).

Compared to a disk drive system (where speed of movement between tracks is critical), tape drive moving head systems do not require extremely fast track to track movements and therefore large acceleration forces are not encountered, thus making it easier to place a tape drive moving head on a selected track. However, a tape drive actuator does need to maintain a steady state in order to keep the head on the selected track.

Therefore, tape drive designers have to determine a proper mix of design elements (mass of moving parts: spring, head and actuator, and the spring constant) to determine a resulting mechanical resonance that can be reduced or eliminated effectively. Basically, the higher the mass, the lower the resonance, but more control difficulties are encountered. The higher the spring constant, the higher the resonance, but higher power is required.

Simply increasing the spring constant (Ks) higher to place the mechanical resonances out of band is not an effective solution because, in addition to higher power consumption, the higher spring constant also reduces a vertical range of motion of the moving head. Conversely, if the spring constant is too low (too loose), then the head will start floating around and control becomes more difficult.

The increasing storage capacities of modern media have added additional problems to tape drive design. These problems basically revolve around higher track densities and higher perturbation from the system because the tape is being run faster. Under normal operation, the tape being written/read moves up and down (perturbation). However, additional tracks and faster tape movement cause the up and down motion of the tape to be higher. In addition, a higher tracking bandwidth is also required because higher tape density (additional tracks, for example) requires more precise placement of the moving head. Each of these factors causes the resonance to become a main factor in the servo load of the tape deck.

An additional factor in tape drive design is damping. Damping is required to keep the spring mass system from continuing to resonate after each inflection (each up or down motion of the head, for example). The spring mass system by itself has very low damping, which causes a small inflection produces a lot of resonance. The resonance of the spring mass system eventually dies down, but normally takes a considerable amount of time. Therefore, modern tape drive designs provide damping systems to limit resonance behavior.

Damping systems typically consist of lossy materials that disrupt resonance behavior. For example, a viscous oil may be used to surround part of the spring and/or actuator to provide damping. However, because these damping systems are mechanical units, they are costly, requiring additional design, space, manufacturing steps, and maintenance.

For example, damping by lossy materials requires design decisions such as where and how to place the lossy material. Maintenance problems include leakage of the lossy material (leakage of viscous oil, for example). In addition, a tape drive system is physically limited in space, thereby limiting an amount of lossy material that may be utilized. Each of the above factors usually cause system designers to push resonance frequencies higher by stiffening the spring.

Therefore, by using a mechanical or viscous oil-type damping system, designers are still required to utilize stiffer springs, which requires a higher power system. In attempting to design with a looser spring, additional range is afforded, but at a loss of mechanical stiffness or rigidity, which is necessary in order to maintain the moving head in a vertical plane.

SUMMARY OF THE INVENTION

Accordingly, it is an object of this invention to provide a damping system for a moving head in a tape drive system that solves the above-mentioned problems and provides damping and maintains rigidity without requiring a high spring constant.

It is another object of this invention to provide a damping system for a moving head in a tape drive system that determines an amount of damping to be applied to the moving head based on a velocity of the moving head.

It is another object of the invention to provide a damping system that applies damping to a moving part electronically.

It is yet another object of the invention to provide a damping system that determines an amount of damping to be applied to a moving part based on the velocity of the moving part where the velocity is determined by more than one method.

These and other objects are accomplished by an apparatus for damping, including a first measurement device configured to measure velocity of a moving part, a damping calculation mechanism configured to determine an amount of damping based on the measured velocity, and an applicator configured to apply the damping determined to the moving part.

The first measurement device measures velocity of the moving part by any of a number of methods, including one of (1) an EMF device configured to measure a back EMF generated due to the velocity of the moving part, and (2) a signal reception device configured to receive a positioned signal corresponding to a position of the moving part, each in conjunction with a velocity calculator configured to determine the velocity of the moving part based on either the position signal received or back EMF measured.

Other methods or devices for determining the velocity of the moving part are also applicable. In one alternative embodiment, the damping system may utilize multiple velocity measurement techniques and apply the technique that provides an available or most accurate velocity at any given moment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
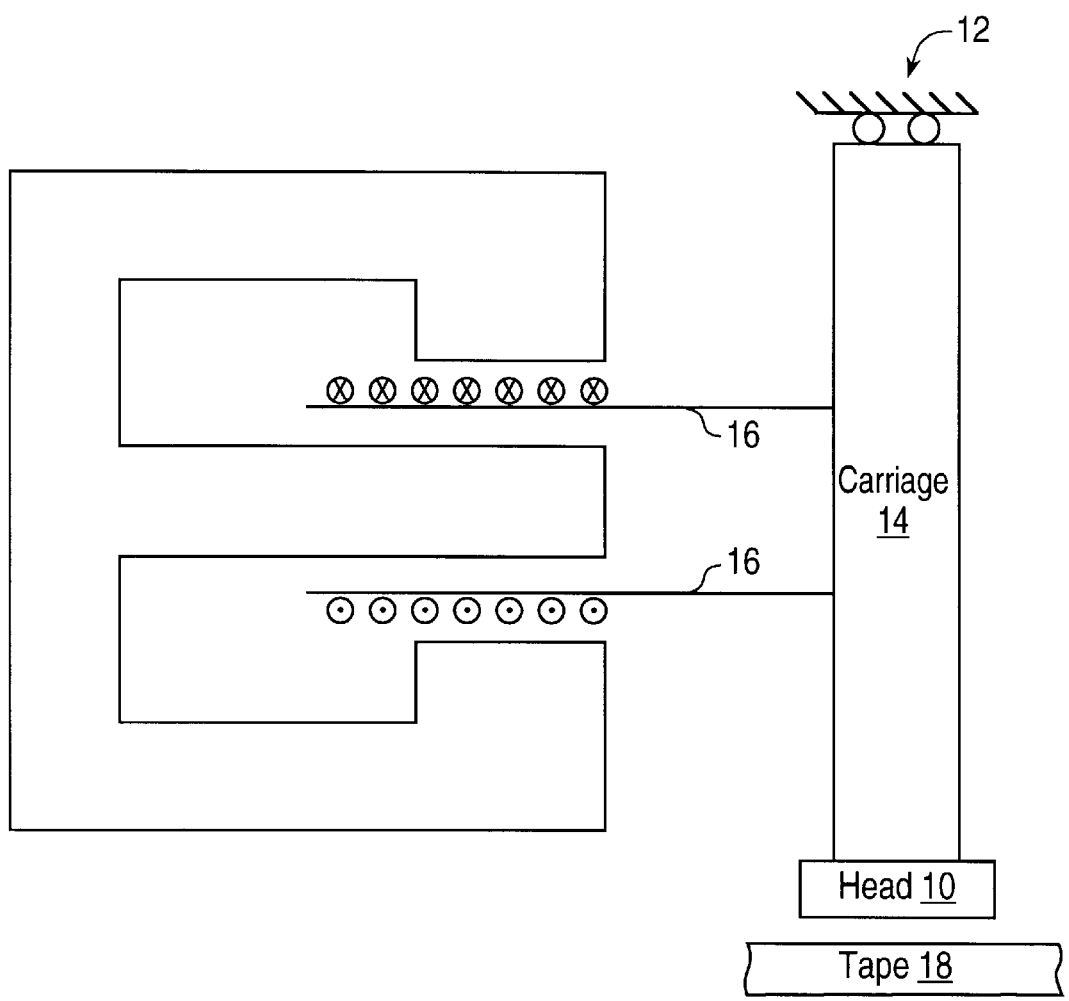
FIG. 1 illustrates a conventional linear bearing system utilized for moving a read/write head in a disk drive system.
Figure 2:
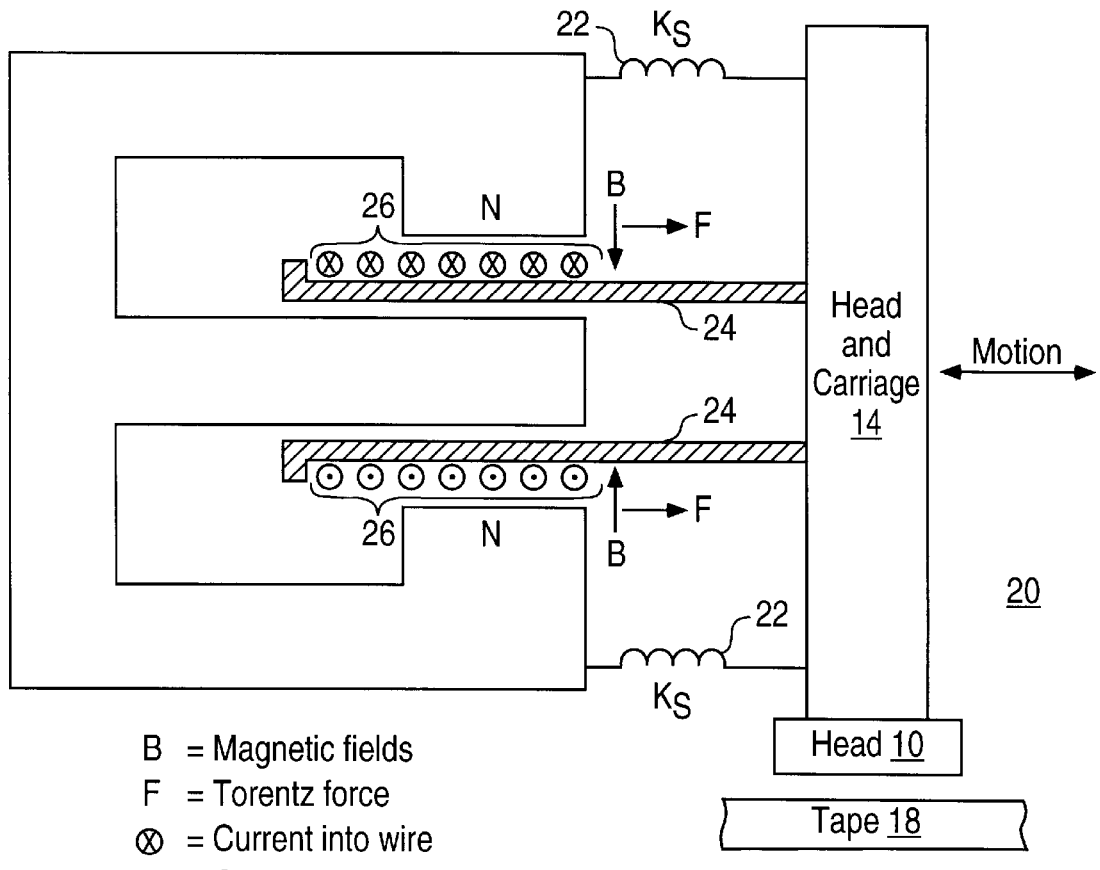
FIG. 2 illustrates a conventional moving head (spring mass) system utilized in a tape drive unit.
Figure 3:
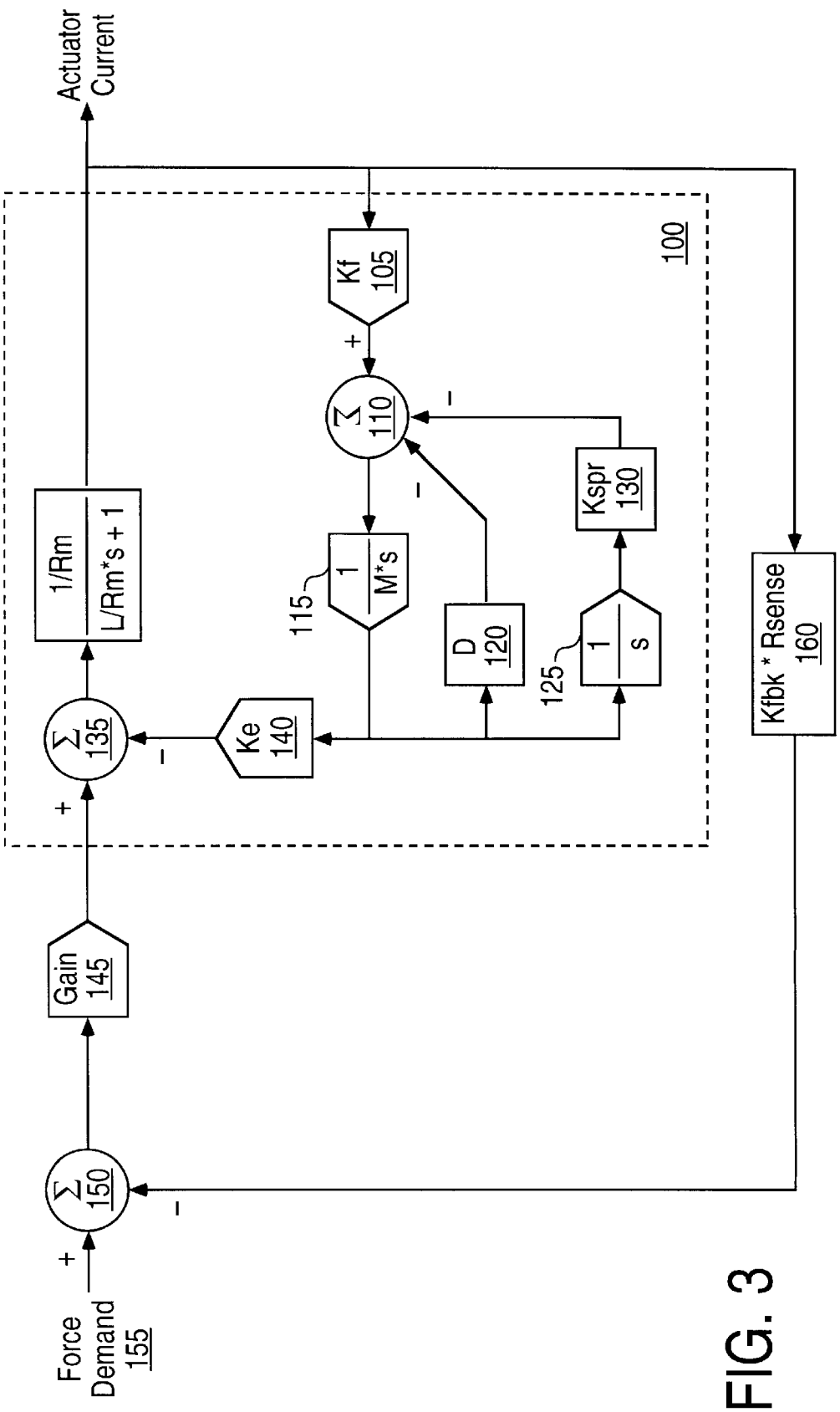
FIG. 3 is a control diagram illustrating a viscosity damped actuator control system.

Referring now to the drawings, wherein like reference numerals designate identical or corresponding parts throughout the several views, and more particularly to FIG. 3 thereof, there is illustrated a control diagram for a viscosity damped actuator control system. In FIG. 3, a force demand 155, combined with a feedback term 160 representing an amount of feedback proportional to actuator current, is applied to an electrical model of a motor 100. The motor 100 supplies force to an actuator for positioning an object such as a tape drive head.

The actuator force is shown in block 105 as Kf which is summed in a mechanical summing block 110 along with forces including damping 120 and spring forces modeled by position block 125 and spring constant block 130. The summed actuator forces are then integrated by block 115 to represent actuator velocity. Actuator velocity is responsible for creating a voltage in windings of the motor 100, known as back EMF. Back EMF is represented in the control diagram at block 140.

Inputs to the motor 100 are summed by summing block 135 and include the back EMF term 140 and the voltage provided by a combination of force demand 155 and feedback 160 (from summing block 150) amplified by gain block 145.

The present inventors have realized that the back EMF, directly proportional to actuator velocity, may be utilized in order to provide an additional feedback term to the force demand, altering the force demand in a manner that electrically provides a damping effect on actuator motion.

Figure 4:
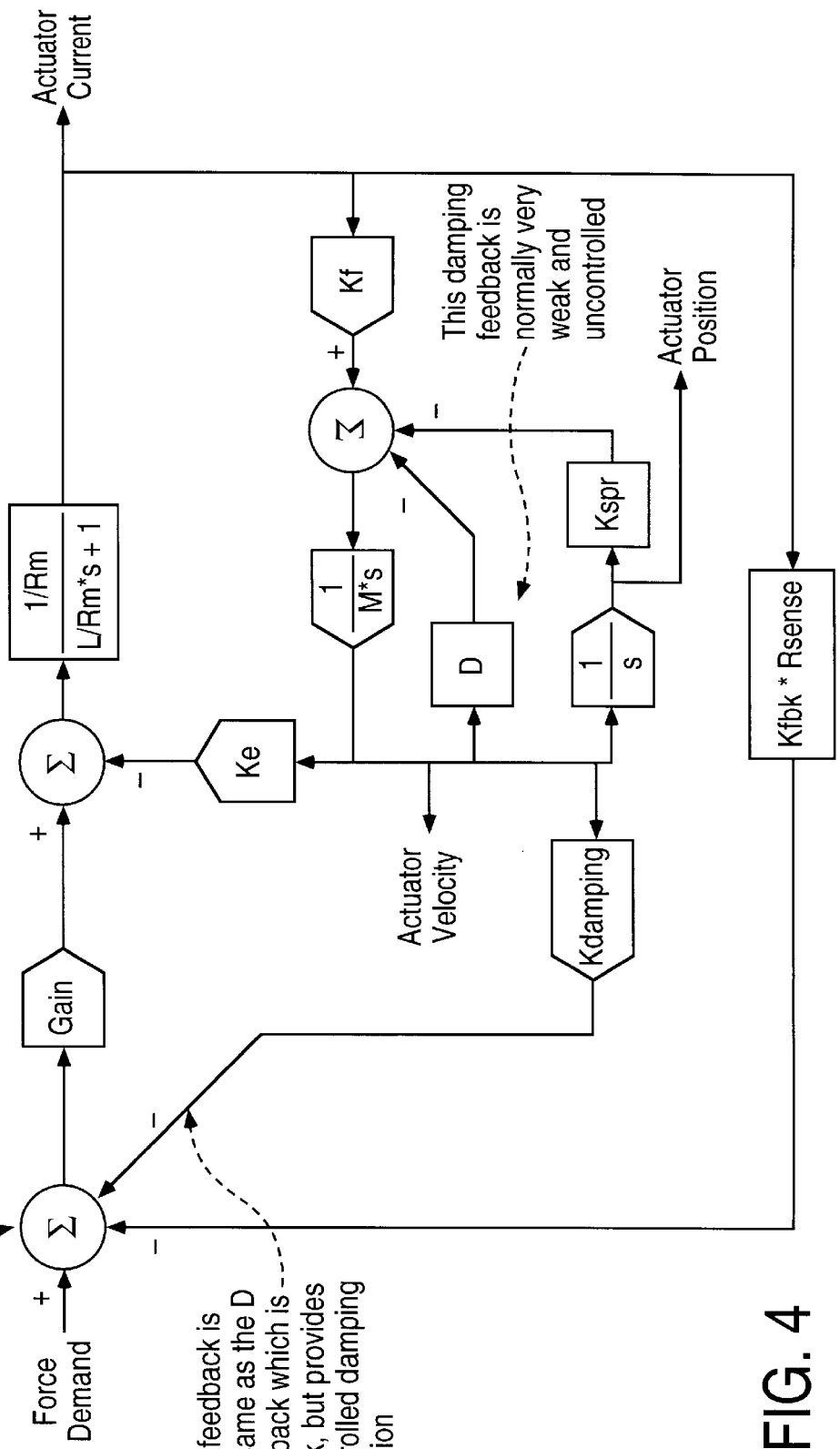
FIG. 4 is a control diagram illustrating an electronically damped current mode actuator control system according to the present invention.

FIG. 4 is a control diagram of an electronically damped current mode actuator control system according to the present invention. The control system in FIG. 4 includes K damping 165. The K damping 165 is a feedback term that is adjusted proportionally according to actuator velocity. The K damping 165 is summed with force demand 155 at summing block 150 and has the effect of altering the force demand and the summation of forces at block 135 applied to the motor 100, thus altering the position of the actuator.

Motor 100 may be implemented as a voice coil-type system or other electronic device, including an electrical or electronic motor or other device commonly used in the art. When the K damping 165 is fed back to summing block 150 and ultimately to the motor 100, motion of the actuator is altered in a manner similar to mechanical damping that is normally performed by a viscous material in contact with an actuator or other moving part.

The control diagram of FIG. 4 also includes a gain block 145. The gain block 145 amplifies the forces summed at block 150 and reduces an error term, thereby increasing stability of the overall system.

By keeping the gain of gain block 145 high, summing block 150, summing force demand, feedback 160, and K damping 165 is mathematically equal to the mechanical summing block 110 for Kf, Kspr, and D (mechanical damping) 120. Therefore, the force demand equals the motor current and the summing blocks are mathematically equal thereby maintaining a position of the actuator.

Figure 5:
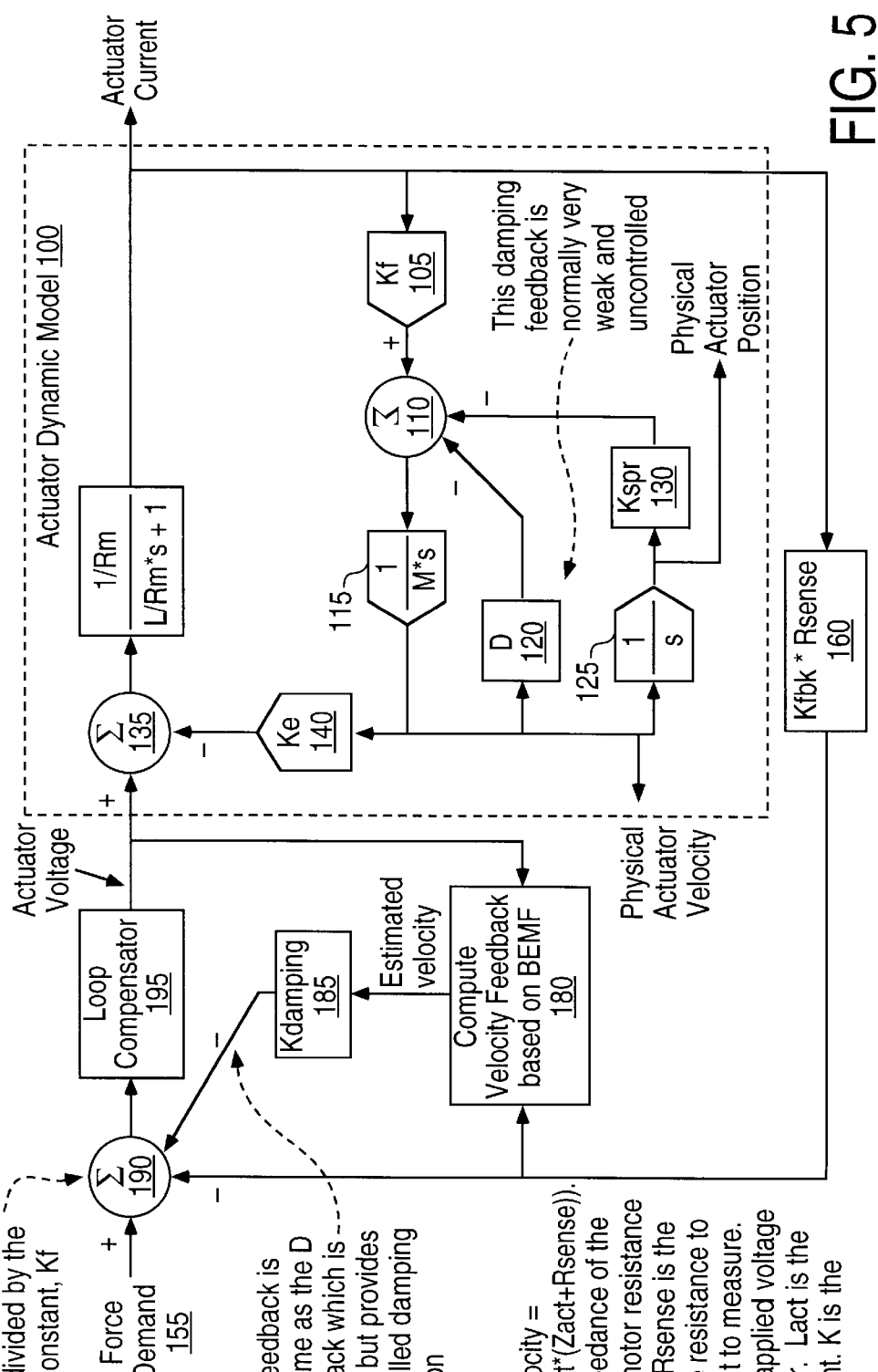
FIG. 5 is a control diagram illustrating an implementation of the electronically damped current mode actuator control system according to the present invention.

FIG. 5 is a control diagram illustrating an implementation of the electronically damped current mode actuator control system according to the present invention. FIG. 5 includes an electrical model of a motor 100, force demand 155, and feedback 160 as similarly illustrated in FIG. 4.

Velocity block 180 utilizes the feedback 160 (back EMF) to compute an estimated velocity. The estimated velocity is used by Kdamping block 185 to determine an amount of electronic damping. The electronic damping is then fed into summing block 190 for summation with the force demand 155 and feedback 160.

The forces summed at summary block 190 are provided to a look compensatory 195 that provides a gain and reduces an error voltage present in the summed forces. In this manner, electronic damping is applied to the motor 100 to reduce oscillations or ringing of the actuator.

Table 1 is a print-out of a program that the present inventors have utilized in order to perform test simulations of the electronically damped current mode actuator control system according to the present invention. The program sets various system constants, including masses, forces and other values consistent with the control diagrams of FIGS. 4 and 5.

TABLE 1 echo off
% Vortex Linear Amp Current Loop design for the fine actuator
% by Turguy Goker TABLE 1-continued

```
% Rev XO
% Task : Design a regulator to control the force into the actuator
% motor, which is a spring mass system with very small damping co-
% efficient. Also design a electronic damping feedback that simulates
% the mechanical damping which is normally done by putting a viscous
% material between the moving part and the stationary part of
% the actuator assembly.
%
% Electronic Damping Feedback :
% This feedback basically simulates the mechanical feedback term that
% closes the loop around the velocity term and the force input, the
% damping term. In these actuators, there is very small amount uncon-
%trolled amount of damping term which causes very large undesirable
% peaking at the resonant frequency. This Electronic Damping Feed-
% back is intended to provide a damping term to the servo by an
% Electronic method instead of mechanically by the use of viscous
% oil type of materials.
%
% Implementation Technique :
% Measurement of Back EMF provides the velocity state variable. In
% order to implement the mechanical damping effect, we must feed back
% this term with a dc gain to the torque or current node of the
% system. This will monitor the velocity of the actuator and modify
% the force applied to it proportionally. The current node is gener-
% ated by the current feedback loop. when we implement a very high
% bandwidth current loop, we basicly create this node outside the
% actuator as a summing junction. It is this junction that we feed-
% back the velocity term in order to simulate the damping effect.
% Therefore this becomes a dual feedback system.
clc
clf
echo on
pause % Strike any key to continue
clc
%
% SECTION 1 : CURRENT LOOP STABILIZATION
% Using Newton's law, the simplest model for the read/write head has the
% following differential equation:
%
% M*x_ddot + D*x_dot + KS*x = Kf * i
%
% where M is the mass
%       Kf is the actuator force constant
%       D is the damping coeff of the actuator N-sec/m
%       Ke is the actuator back emf
%       L is actuator inductance
%       R is actuator resistance
%       Kamp is amplifier gain in volts/volt
%       Kfbk is the current feedback gain in volts/amp
%
pause % Press any key to continue . . .
% Taking the laplace transform, the transfer function is:
%                         M/R * s
% H(s)  ─────────────────────────────────
%           M * L/ R * s^2 + M * s + Ke * Kf / R
% Using the following values for the system study:
%       M = .011 Kgm
%       D 1 N-sec/m
%       Ks 19665 N/m
%       Ke = 10 v-sec/m
%       Kf = 10 N/amp
%       Rm = 41
%       Lm = 7E-3
%       Kfbk = 10 v/v
%       Rs = 2.2 ohms
% SYSTEM VARIABLES DEFINED:
%
M = 0.001 ; Rm = 41; Lm = 0.007; Kfbk = 10; Rs = 2.2;
Kf = 10; Ke = 10; D = I; Ks = 19685;
%
% VOLTAGE TO CURRENT TF WITH Lm & Rm LOAD:
te = Lm/Rm;
num1 = [1/Rm]
den1 = [te 1];
G1 = tf(num1,den1)
%
% MECHANICAL TF WHICH IS THE FEEDEACK TERM TO THE
% G1 TF:
```

TABLE 1-continued

```
% numerator is a differentiator, denominator is a 2nd order
% function
%
num2 = [Ke * Kf 0];
den2 = (M D Ks];
H1 = tf(num2 ,den2)
% TF OF THE PLANT ACTUATOR VOLTAGE TO THE
% ACTUATOR CURRENT
% Now lets combine these TF, G1 & H1 such that H1 in the forward path
% and H2 is in the feedback path
G2 = feedback (G1 ,H1)
% Now lets multiply this plant TF with the feedback gain
GHi = Kfbk*Rs*G2
pause % Press any key to continue . . .
clc
bode (GH1)
title('TF of Actuator Current to Act Voltage');
pause % Press any key to continue . . .
%
Gain = 20
GH = Gain * GH1
%
% GH is the open loop TF of the current loop control
%
bode(GH);
title('Open Loop TF of Act. cur to cur loop error signal with DC Gain');
pause % press any key to continue
Cloop = GH/(GH + 1);
bode (Cloop);
title ('Closed Loop TF of Act cur to Demand Current');
pause % press any key to continue
step (Cloop)
%
pause % press any key to continue
% Using this compensator control, we will evaluate the TF
% of position output to current demand
%
% G1 is the actuator motor electrical TF, L & R
% Gp is the actuator mechanical TF, M, D, & Ks
% Hfl is the TF of the actuator current feedback term
%
GC = 20; Hfl = Kfbk * Rs;
nump = Kf;
denp = [M D Ks];
Gp = tf(nump,denp)
Hf0 = tf([Ke 0],[1])
Gp1 = Gp*G1;
Gp2 = feedback(Gp1,Hf0)
Gp3 = Gp2 * Gc
Gp4 = Hfl/Gp
Gp5 = feedback (Gp3 , Gp4)
wmin = 10; wmax = 10000;
Bode(Gp5,{wmin,wmax});
title('TF of Actuator position to Current Demand');
pause % press any key to continue
Hf2 = tf([2 * Ke 0],[1])
GH = feedback(Gp5,Hf2)
Bode(GH, {wmin,wmax});
title ('Closed Loop TF of Act Pos to Cur demand with
Electronic Damping');
```

Figure 6:
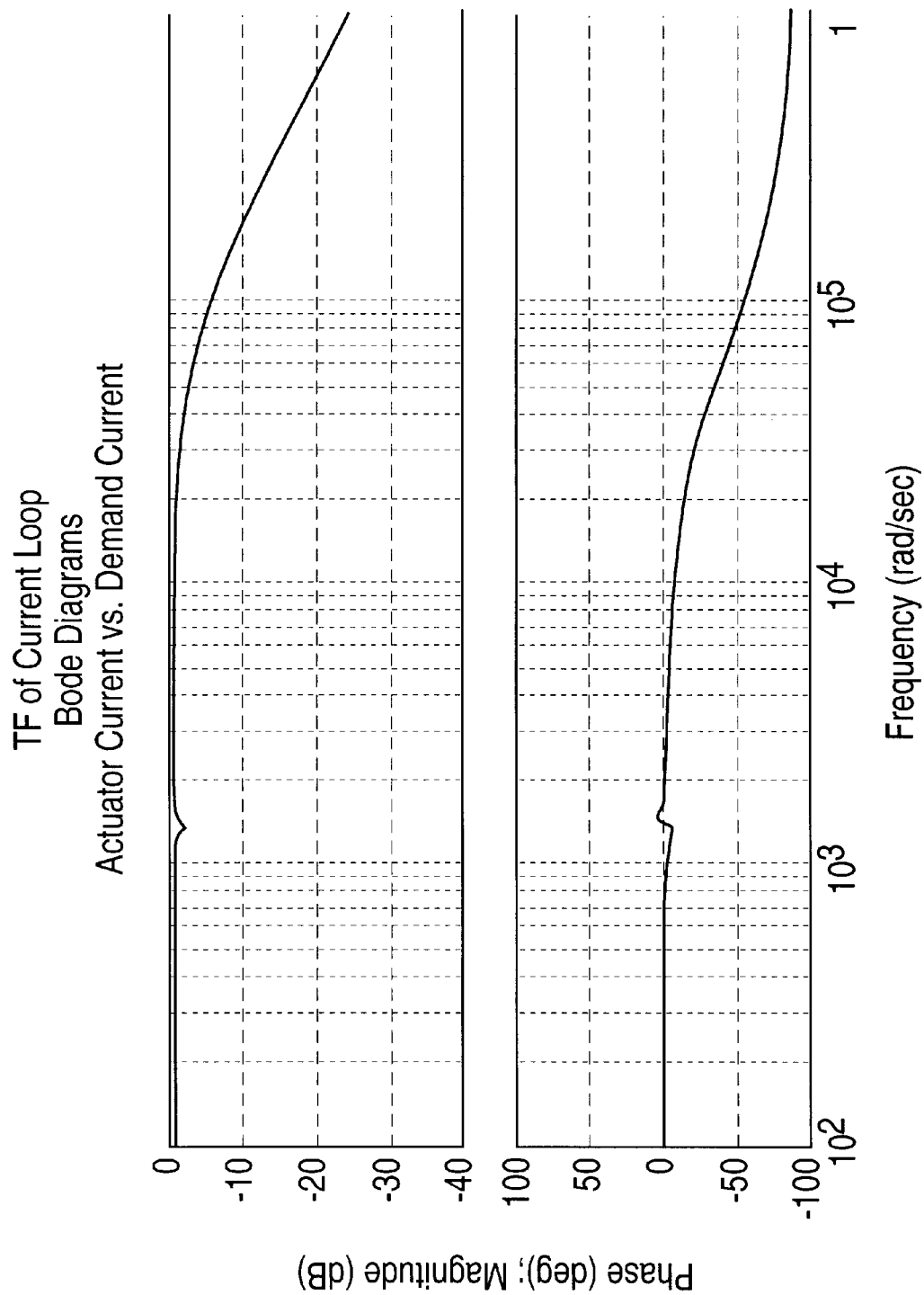
FIG. 6 is a bode diagram plotting actuator current vs. demand current for a high-gain electronically damped current mode actuator control system according to the present invention.
Figure 7:
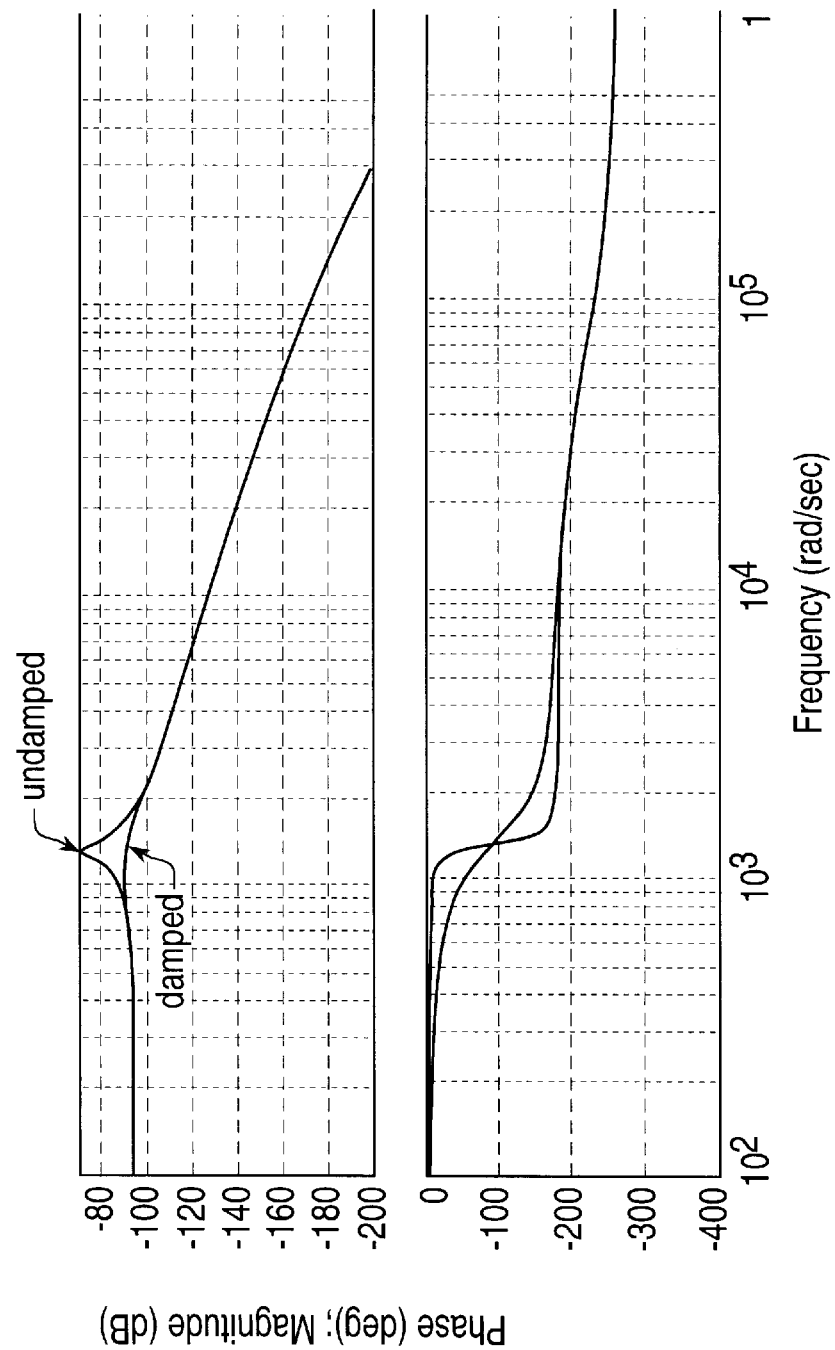
FIG. 7 is a bode diagram illustrating a comparison between an undamped and electronically damped current mode actuator control system plotting actuator position vs. demand current, according to the present invention.

The program produces the bode diagrams shown in FIGS. 6 and 7. In FIG. 6, a transfer function of a current loop is shown plotting actuator current vs. demand current. The actuator current to demand current illustrates force demand to actuator demand by keeping the gain block high and over the basic bandwidth of the system is seen a zero db, basically unity gain. Accordingly, a tape drive system using such an electronically damped actuator system would not experience undamped resonance (ringing in the time domain) in that same bandwidth.

FIG. 7 illustrates transfer function of actuator position vs. demand current for both electronically damped and undamped systems. As shown in FIG. 7, the undamped system shows a peak and a sharp drop in base as opposed to the damp system, which has a smooth transfer function and smooth transition in phase. The undamped system has some resonance and some peaking, but when electronic damping is provided, a damped response is achieved where you do not have peaking.

Figure 8:
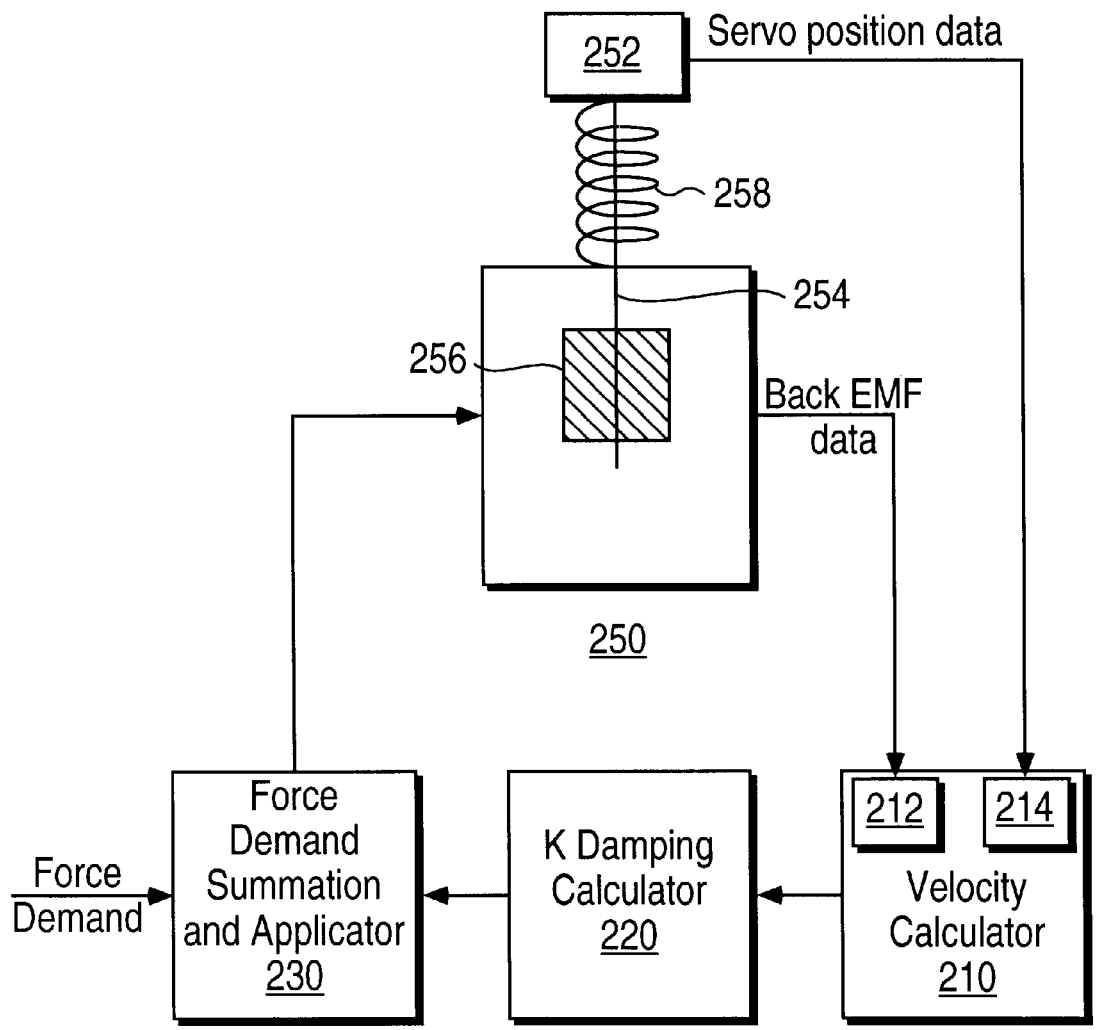
FIG. 8 illustrates a moving head system utilizing the electronically damped current mode actuator control system according to the present invention.

The present invention has been implemented by applying a K-damping feedback term to the force demand in a tape drive moving head system. FIG. 8 illustrates a moving head system 200 according to the present invention.

The moving head system 200 includes a moving head apparatus 250 including a moving head 252, actuator 254, voice coil 256, and return spring 258. The moving head apparatus provides back EMF data to a back EMF calculator 212. The back EMF data includes voltage applied to the actuator and current of the actuator. The current of the actuator is indicative of the resistive and inductive drops across the voice coil 256. The back EMF calculators takes the difference between the voltage applied to the actuator and the resistive and inductive drops across the voice coil 256 to determine the back EMF voltage. The back EMF voltage, being generated by motion of the actuator 254 in the voice coil 256, is proportional to the velocity of the actuator.

The back EMF voltage is provided to the velocity calculator 210 which determines the velocity of the actuator based on the back EMF voltage. The actuator velocity is provided to the K-damping calculator 220 which determines a K-damping factor representing an amount of damping to be applied to the actuator based on the actuator velocity.

The K-damping factor is applied to the force demand summation and applicator 230 which sums the K-damping factor with an external force demand and determines a total amount of force to be applied to the actuator. The force demand summation and application 230 also provides a voltage representative of the total force determined to the voice coil 256. In this manner, feedback based on the velocity of the actuator modifies the voltage (total force) to be applied to the voice coil, thereby damping movement of the actuator 258 electronically.

Linear tape drive systems with high track densities use embedded position information (servo information) feedback signals for determining the position of tracks to be followed by the servo system. This embedded servo information is longitudinal and arranged in groups from the bottom edge to the top edge of the tape. Since both data and the servo information must occupy the same tape surface, the servo information is arranged in regions along the tape.

An example of a tape format with embedded servo information is defined by the LTO track format, a timing based servo format developed jointly by Seagate, IBM, and Hewlett-Packard. When a servo head is placed on a given track, the servo head reads the servo (position) information which is used to provide a feedback signal regarding head position. An error generated from the feedback signal is used to adjust the head actuator mechanism to move up or down in order to minimize the error. The amount of adjustment is determined by a servo control algorithm executed on one of a microprocessor based digital controller and other computing mechanism, or by electronic circuitry.

The present invention utilizes a derivative of the servo position data (feedback signals) to determine a velocity (or error) in head position. Alternatively, the error may also be determined by a difference between the servo head position and a position of a track on which the servo head has been directed.

Other methods to determine an amount of adjustment to properly position the servo head may also be utilized without departing from the scope of the present invention. In addition, the position information may be magnetic, optical, or other means and reading may be performed by a read/write head, a separate head positioned specifically for reading position data, an external head or other device able to identify a position of the servo head with respect to tracks of the device (tape, in this example) on which the servo is operating.

Therefore, in an alternative embodiment, the velocity calculator 210 may also determine the velocity of the actuator based upon servo position data. The head 252 reads servo position data from a tape and provides that servo position data to a position calculator 214 that provides the position of the moving head to the velocity calculator 210. Based on a current and previous position of the head, the velocity calculator determines a velocity of the head which is then provided to the K-damping calculator 220. In the same manner as discussed above, the K-damping is applied to damp the movements of the actuator 254.

The velocity calculated based on the servo position data has an advantage over the back EMF calculation of velocity because the servo position data provides highly accurate information regarding head position, thus normally resulting in a more accurate K-damping feedback to damp the motion of the head 252. However, not all positions on the tape maintain appropriate servo data that can be read by the head 252. In these cases, an alternate method, such as the back EMF method, is needed to determine actuator velocity.

For example, when the tape drive system instructs the head actuator servo to position on another track which belongs in another servo format group on the tape, the servo system must move the head from the present track to the target track and lock on the target track when it gets there. Since the tracks are arranged in bundles where in between bundles there is no position feedback information, unless the target track belongs to the same bundle, servo will move in open loop (without feedback from the tape regarding position) until it starts reading the new servo feedback information. Therefore, during the search mode it is quite possible that the head actuator servo will switch between open loop and closed loop modes.

Most tape drive systems utilize a head actuator that is an under damped spring mass system. This is a second order system having a resonance frequency placed within the tracking servo bandwidth. In one embodiment of the present invention, where the servo feedback is present, the servo system provides electronic damping and compensation based on the feedback in order to minimize the error signal. When the servo feedback is not present, electronic damping and compensation is based on back EMF.

A spring mass system will move by a fixed distance based on the actuator current due to the fact that the spring position is proportional to the actuator force which is also proportional to the actuator current by an electromagnetic force constant. Since there is no damping term in this spring mass system, unless it is controlled by an electronic position feedback such a servo signal from the tape (optical or magnetic) or a separate optical type of position sensor, the step response of actuator position to the actuator current will exhibit ringing that will last based on the resonance frequency and damping. The amount of ringing depends upon the resonance frequency and damping, the lower the frequency and the damping, the longer the ringing will last.

In linear tape drive systems, and particularly in systems where the position information is grouped in bundles across the tape (each bundle being associated with at least one track), head actuator response during searching between tracks from one bundle to a new bundle will experience excessive ringing (a time domain response) as the head moves between tracks and arrives at a target position. The servo cannot read the embedded feedback signal from the tape within the new bundle until the ringing is damped out.

Figure 9:
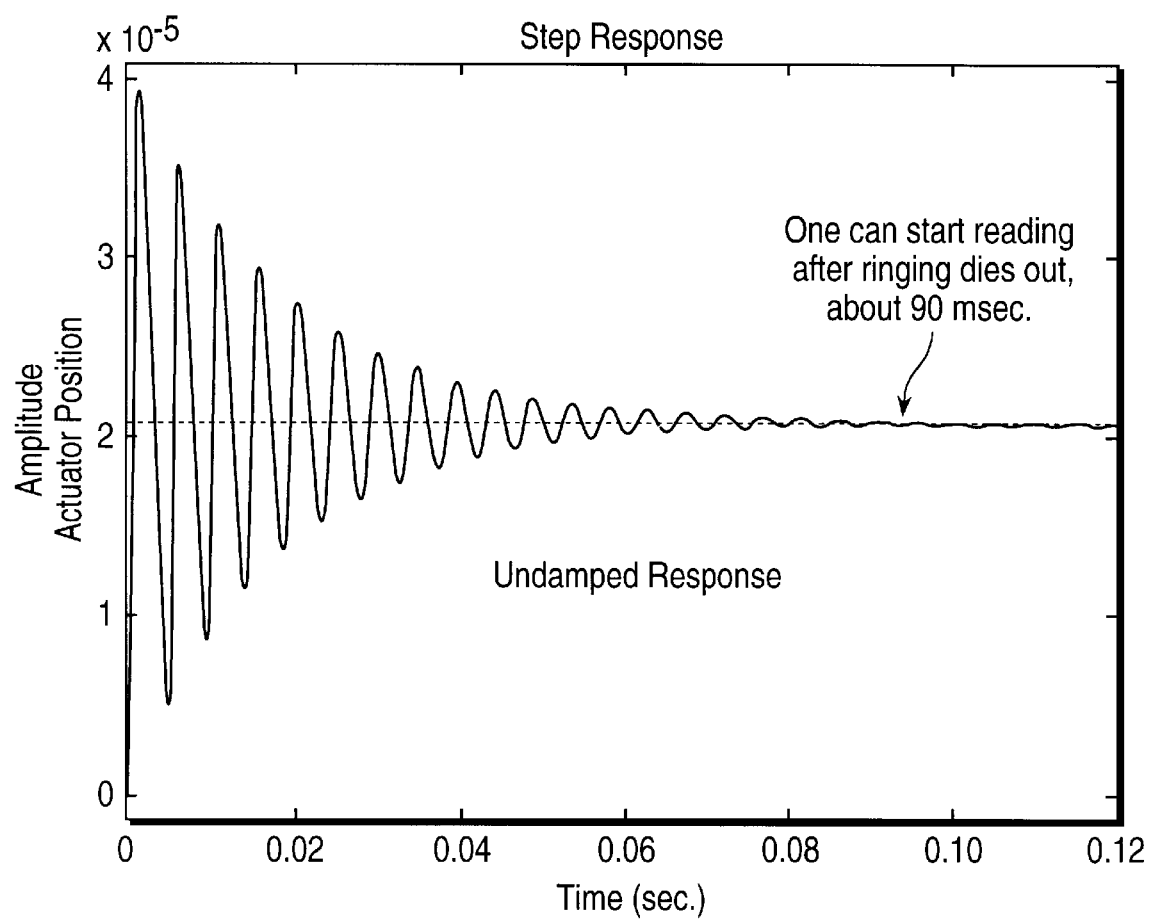
FIG. 9 is a graph of a time domain representation of an undamped actuator.

FIG. 9 illustrates a time domain response of an actuator when moving a servo head between tracks on a tape drive. The time domain response shows an oscillation or ringing in the actuator that damps out at approximately 90 milliseconds. Waiting for the ringing to damp out with the tape moving at high speed will result in a large amount of tape being moved prior to a start of reading the position information and accurate tracking. This will reduce the performance of the system.

The ringing may be reduced or eliminated by providing the servo with another physical feedback sensor that provides continuous position information that can be used by the servo to provide damping to the time domain response. The use of Back EMF based electronic damping during the seek process (searching between tracks) allows the servo head to start reading data as the head arrives to the bundle since there is no ringing in the critically damped actuator.

Figure 10:
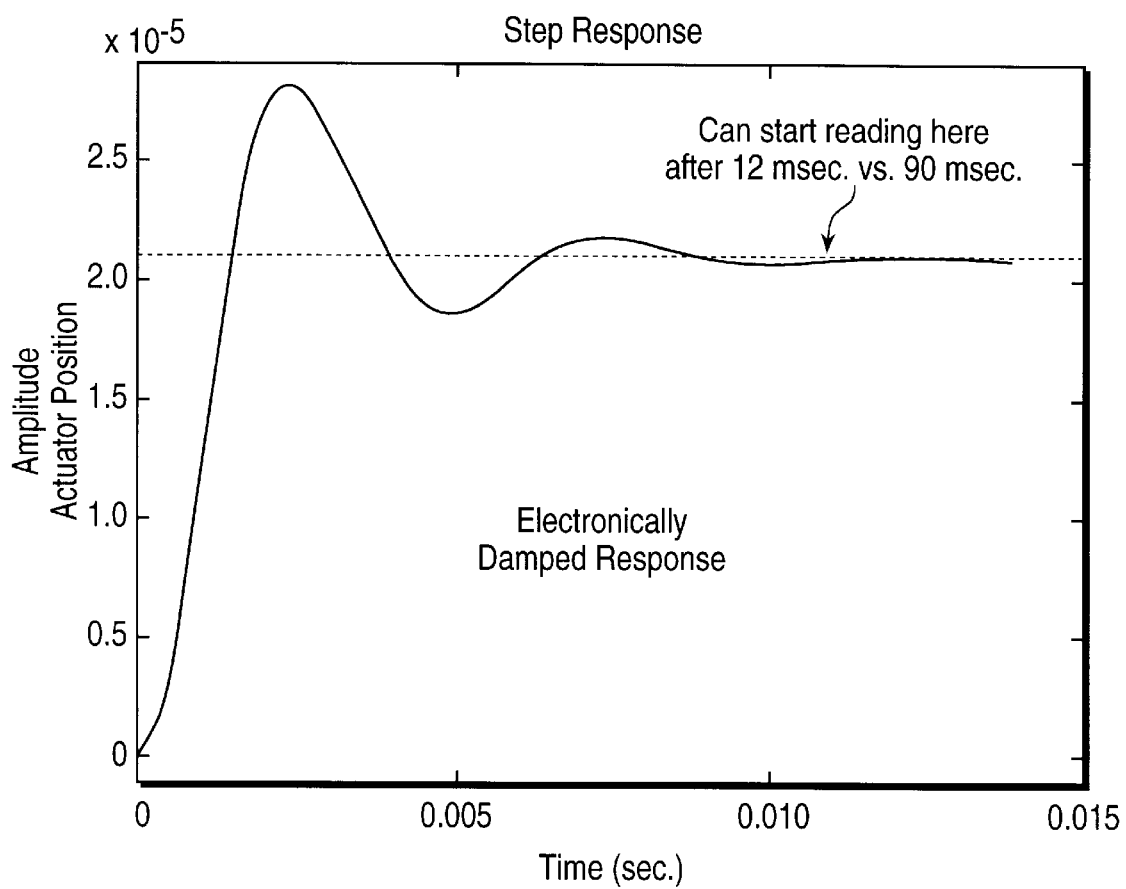
FIG. 10 is a graph of a time domain representation of an electronically damped response according to the present invention.

FIG. 10 is a graph illustrating a time domain response of an electronically damped actuator when moving a servo head between tracks. The electronically damped actuator uses back EMF of the actuator to determine an amount of damping to apply. As seen in FIG. 10, the ringing is effectively damped after 12 milliseconds, thus allowing faster seek times between tracks.

Once the embedded position information is read by the servo head, back EMF damping can be disabled since the servo data provides the positional feedback which will be used by the controller to dampen the actuator response and minimize the servo error. This dual use of electronic damping allows the system to be optimize without requiring a dedicated feedback signal to provide the actuator position while the head is between servo signal regions (bundles).

The present invention includes the ability to determine the velocity of the actuator based on plural velocity calculation methods and select the best method for determining the velocity. One appropriate arrangement between alternate velocity calculation methods is to utilize the servo position data in determining all velocity calculations when valid servo data can be read from the tape. When valid servo position data is not available, an alternate method such as the back EMF method is utilized to determine the velocity. Although servo position data is a more accurate velocity measurement, the back EMF method is accurate enough to determine appropriate damping to at least maintain the head in a stable position for normal operations.

Applicants have tested and achieved the same results in lab tests as with the simulation program as discussed previously. For example, the present inventors have tested a Tanburg drive that utilizes only lossy material (viscous oil) for damping. The Tanburg drive has a mechanical resonance in the range of 250–300 Hz which indicates a high spring constant Ks. However, in a system built utilizing the control system described in FIGS. 4 or 5, a resonance of between 70 and 80 Hz is experienced, allowing operation with considerably less power (lower spring constant) and over a wider vertical range.

Portions of this invention may be conveniently implemented using a conventional general-purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

Any portion of the present invention implemented on a general-purpose digital computer or microprocessor invention includes a computer program product which is a storage medium including instructions, which can be used to program a computer to perform a process of the invention. The storage medium can include, but is not limited to, any type of disk, including floppy disk, optical disks, DVD CD-ROMs, and magneto-optical disks, ROMs, RAMs, EEPROMS, magnetic or optical cards, or any type of media suitable for storing electronic instructions.

Stored on any one of the computer readable medium (media), the present invention includes software for controlling both the hardware of the general purpose/specialized computer or microprocessor, and for enabling the computer or microprocessor to perform the present invention. Such software may include, but is not limited to, operating systems, modules for receiving and interpreting position signals, calculation routines and applications. Ultimately, such computer readable media further includes software which determines and directs the application of an amount of damping as described above.

Obviously, numerous modifications and variations of the present invention are possible in light of the above teachings. It is therefore to be understood that within the scope of the appended claims, the invention may be practices otherwise than as specifically described herein.

What is claimed is:

1. A method of damping, comprising the steps of:
    performing a first velocity measurement of said moving part comprising the steps of:
        receiving a position signal that identifies a position of said moving part, said position signal comprising servo track data read from a recording medium; and
        deriving the velocity of said moving part based on said position signal;
    determining an amount of damping based on the measured velocity; and
    applying the damping determined to said moving part.

2. The method according to claim 1, farther comprising the steps of:
    performing a second velocity measurement including:
        measuring a back EMF generated due to the velocity of said moving part; and
        deriving a velocity of said moving part based on the back EMF measured.

3. The method according to claim 2, wherein said step of measuring a back EMF voltage comprises the steps of:
    measuring a resistive and inductive drop across an electrical device that applies force to said moving part;
    measuring a voltage applied to said electrical device; and
    subtracting the resistive and inductive drop from the voltage applied to said electrical device to determine said back EMF.

4. The method according to claim 1, further comprising the steps of:
    utilizing said step of performing a first velocity measurement to determine the velocity of said moving part when said position signal is present; and
    utilizing a second velocity measurement to determine the velocity of said moving part when said position signal is not present.

5. The method according to claim 4, wherein said second velocity measurement comprises:
    measuring a back EMF generated due to the velocity of said moving part; and
    deriving a velocity of said moving part based on the back EMF measured.

6. The method according to claim 4, wherein said second velocity measurement comprises the steps of:
    measuring a resistive and inductive drop across an electrical device utilized to apply force to said moving part;
    measuring a voltage applied to said electrical device;
    subtracting the resistive and inductive drop from the voltage applied to said electrical device to determine a back EMF; and
    deriving a velocity of said moving part based on the back EMF measured.

7. The method according to claim 4, wherein
    said step of utilizing a second velocity measurement comprises,
    utilizing said second velocity measurement when said moving part is between areas where said position signal can be detected.

8. An apparatus for damping, comprising:
    a first measurement device configured to measure velocity of a moving part comprising:
        a signal reception device configured to receive a position signal corresponding to a position of said moving part, said position signal being at least partially based on servo data obtained from a data storage medium; and
        a velocity calculator configured to determine the velocity of said moving part based on the position signal received,
    a damping calculation mechanism configured to determine an amount of damping based on the measured velocity; and
    an applicator configured to apply the damping determined to said moving part.

9. The apparatus according to claim 8, further comprising a second measurement device comprising:
    an EMF device configured to measure aback EMF generated due to the velocity of said moving part; and
    a velocity calculator configured to determine the velocity of said actuator based on the back EMF.

10. The apparatus according to claim 9, wherein said EMF device comprises:
    a resistive inductive drop device configured to measure a resistive and inductive drop across an electrical device that applies force to said moving part;
    a voltage application device configured to measure a voltage applied to said electrical device; and
    an EMF device configured to determine a back EMF generated based on said voltage applied and said resistive and inductive drop.

11. An apparatus for providing damping, comprising:
    a primary means for measuring velocity of a moving part comprising:
        means for receiving a position signal that identifies a position of said moving part, said position signal being at least partially based on servo track data read from a recordable medium; and means for deriving the velocity of said moving part based on said position signal received;

means for determining an amount of damping based on the measured velocity; and means for applying the damping determined to said moving part.

12. The apparatus according to claim 11, wherein:

said moving part includes an input port for receiving inputs for activating said moving part; and said means for applying the damping determined comprises, means for summing the damping determined and the inputs received by said input port; and means for applying the sum of inputs and damping to activate said moving part.

13. The apparatus according to claim 12, further comprising:

a secondary means for measuring velocity comprising, means for measuring a back EMF generated due to the velocity of said moving part; and means for deriving the velocity of said moving part based on the back EMF measured.

14. The apparatus according to claim 13, wherein said moving part is activated by an electrical device; and said means for measuring back EMF comprises, means for measuring a resistive and inductive drop across said electrical device;

means for measuring a voltage applied to said electrical device; and means for subtracting the resistive and inductive drop from the voltage applied to determine said back EMF.

15. The apparatus according to claim 11, further comprising:

alternative means for measuring velocity of said moving part; and a means for utilizing said primary means for measuring velocity when said means for receiving a position signal receives a position signal adequate to derive the velocity of said moving part, and for utilizing said alternative means for measuring velocity when said means for receiving a position signal does not receive a position signal adequate to derive the velocity of said moving part.

16. The apparatus according to claim 15, wherein:

said alternative means for measuring velocity comprises, measuring a back EMF generated by said electrical device, comprising, means for measuring a voltage applied to said electrical device;

means for measuring a resistive and inductive drop across said electrical device; and means for subtracting the resistive and inductive drop from the voltage applied to determine said back EMF; and said means for applying the damping determined comprises, means for summing the voltage applied to said electrical device and a voltage corresponding to the damping determined; and means for applying the summed voltages to said electrical device.

17. A computer readable medium having computer instructions stored thereon that, when loaded into a computer, causes the computer to perform the steps of:

performing a first velocity measurement of a moving part comprising the steps of:

receiving a position signal that identifies a position of said moving part, said position signal being at least partially based on servo track data read from said computer readable medium; and deriving the velocity of said moving part based on said position signal;

determining an amount of damping based on the measured velocity; and applying the damping determined to the moving part.

18. The computer readable medium according to claim 17, further comprising the steps of:

performing a second velocity measurement including:

measuring a back EMF generated due to the velocity of the moving part; and deriving a velocity of said moving part based on the back EMF measured.

19. The computer readable medium according to claim 18, wherein said step of measuring a back EMF voltage comprises the steps of:

measuring a resistive and inductive drop across an electrical device that applies force to said moving part;

measuring a voltage applied to said electrical device; and subtracting the resistive and inductive drop from the voltage applied to said electrical device to determine said back EMF.

20. The computer readable medium according to claim 17 wherein said computer instructions stored thereon, when loaded into a computer, cause the computer to further perform the steps of:

utilizing said step of performing a first velocity measurement to determine the velocity of said moving part when said position signal is present; and utilizing a second velocity measurement to determine the velocity of said moving part when said position signal is not present.

21. The computer readable medium according to claim 20, wherein said second velocity measurement comprises:

measuring a back EMF generated due to the velocity of said moving part; and deriving a velocity of said moving part based on the back EMF measure.

22. The computer readable medium according to claim 20, wherein:

said step of utilizing a second velocity measurement comprises, utilizing said second velocity measurement when said moving part is between areas where said position signal can be detected.

23. The computer readable medium according to claim 20 wherein said second velocity measurement comprises the steps of:

measuring a resistive and inductive drop across an electrical device utilized to apply force to said moving part;

measuring a voltage applied to said electrical device;

subtracting the resistive and inductive drop from the voltage applied to said electrical device to determine a back EMF; and deriving a velocity of said moving part based on the back EMF measured.

24. An apparatus for damping, comprising:

a first measurement device configured to measure velocity of an actuator attached to a read/record head of a tape drive system comprising:

a signal reception device configured to receive a position signal corresponding to a position of said actuator, wherein said position signal comprises servo track data read from a tape; and a velocity calculator configured to determine the velocity of said actuator based on the position signal received, a damping calculation mechanism configured to determine an amount of damping based on the measured velocity; and an applicator configured to apply the damping determined to said actuator head.

25. An apparatus for damping, comprising:

a first measurement device configured to measure velocity of a moving part;

a damping calculation mechanism configured to determine an amount of damping based on the measured velocity;

an applicator configured to apply the damping determined to said moving part;

a second measurement device configured to measure the velocity of said moving part, said second measurement device measuring the velocity differently than said first measurement device; and a selection device configured to, select the velocity measured by said first measurement device when said first measurement device is able to accurately determine the velocity of said moving part, and select the velocity measured by said second measurement device when said first measurement device is not able to accurately determine the velocity of said moving part; and wherein said damping calculation mechanism utilizes the velocity selected by said selection device to determine the amount of damping.

26. The apparatus according to claim 25, wherein:

said moving part is an actuator attached to a read/record head of a tape drive system; and said position signal comprises servo track data read from a tape; and said first measurement device is unable to accurately determine the velocity of said head when said head is between data tracks on said tape.

27. The apparatus according to claim 25, wherein:

said moving part is a head of a tape drive system; and said position signal comprises servo track data read from a tape, wherein said first measurement device is unable to accurately determine the velocity of said head when said head is between groups of data tracks each group having an independent position signal embedded on said tape.

28. The apparatus according to claim 25, wherein:

said first measurement device comprises, a signal reception device configured to receive a position signal corresponding to a position of said moving part, and a velocity calculator configured to determine the velocity of said moving part based on the position signal received; and said second measurement device comprises, an EMF device configured to measure a back EMF generated due to the velocity of said moving part, and a second velocity calculator configured to determine the velocity of said moving part based on the back EMF.

* * * * *